(No Model.)

C. ZIES.
ROTARY KNIFE.

No. 473,049. Patented Apr. 19, 1892.

Witnesses
C. Thompson
E. R. Rowly.

Inventor
Charles Zies.
By his Attorney
Wm. L. Bailie.

UNITED STATES PATENT OFFICE.

CHARLES ZIES, OF BALTIMORE, MARYLAND.

ROTARY KNIFE.

SPECIFICATION forming part of Letters Patent No. 473,049, dated April 19, 1892.

Application filed December 30, 1891. Serial No. 416,558. (No model.)

*To all whom it may concern:*

Be it known that I, CHARLES ZIES, a citizen of the United States, residing at Baltimore, in the State of Maryland, have invented certain new and useful Improvements in Rotating Knives; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in rotating knives of that class employed in meat-cutting machines. In these machines, where the ordinary straight-edge knife is used, considerable trouble is experienced by the meat becoming packed around the shaft where the cutting-edge of the knife does not reach, thus clogging the machine at this point and lessening its efficiency.

The object of my invention is to provide a set of knives so arranged relatively one with the other and provided with cutting-edges of such form that a clean cut will be made at the shaft and thereby prevent the machine from becoming clogged at that point, all of which I accomplish by the devices hereinafter fully described and claimed, reference being had to the accompanying drawings, in which—

Figure 1:
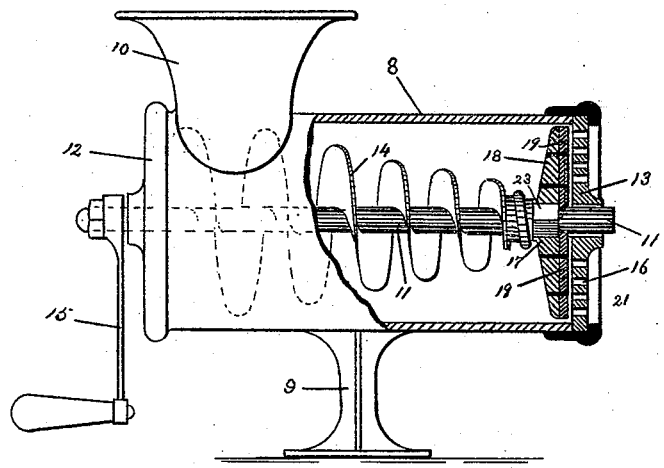
Figure 2:
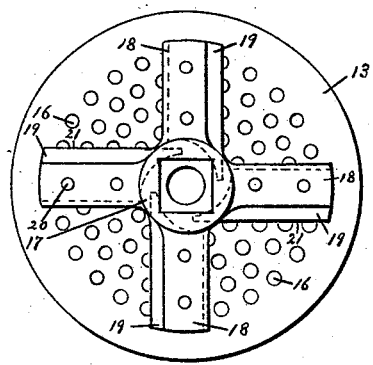
Figure 3:
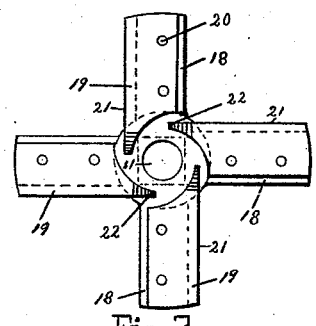
Figure 4:
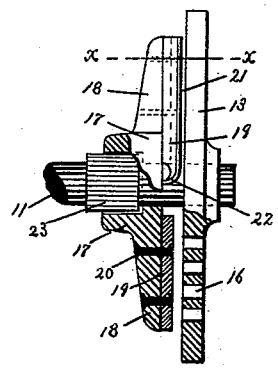
Figures 5, 6, 7:
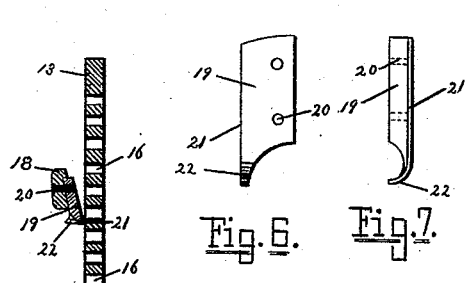

Figure 1 shows a side elevation of a meat-cutter, a part of the casing removed, and the knife-frame, perforated plate, and end nut shown in section. Fig. 2 shows an enlarged detail view of the knife-frame, knives, and perforated plate shown in Fig. 1, looking from the left thereon. Fig. 3 shows an enlarged detail view of the knife-frame and knives shown in Fig. 1, looking from the right thereon. Fig. 4 shows a side elevation of the device shown in Fig. 2, partly in section, the upper arm of the knife-frame and part of the perforated plate shown in full. Fig. 5 shows a cross-section of the device shown in Fig. 4, the section being indicated by the line *x x* of that figure. Fig. 6 shows a detail view of the knife shown in Fig. 3. Fig. 7 shows the side view of the device shown in Fig. 6.

The same numbers refer to the same or similar parts throughout the several views.

In Fig. 1 is shown a common form of meat-cutter, a description of the operation of which will be necessary to understand the advantageous adaptation thereto of my improved knives. The number 8 denotes a cylindrical casing that is supported upon a suitable leg 9, a hopper 10 being placed at the top of the casing through which the material to be cut is fed to the interior thereof. Extended longitudinally through the casing is the shaft 11, which is supported at one end by the head 12 and at the other end by the perforated plate 13, a feed-screw 14 being formed around the shaft, which, when turned in the proper direction by the crank 15, serves to force the material as it falls from the hopper toward the perforated plate and through the perforations 16 therein. In order that the material may be minced or finely cut as it passes through the perforations 16, there is fixed to the shaft 11, by means of a square 23 on the shaft or other suitable device, the knife-frame 17, which is provided with any number of arms 18, (four being shown in the drawings,) the said knife-frame being made, preferably, of composition or other soft metal, each arm 18 thereof being provided with a beveled seat, Fig. 5, to which is fastened, by means of the rivets 20, the hardened steel knife 19, which inclines at such an angle with the perforated plate 13 that the straight cutting-edge 21 thereof will be in contact with the surface of the said perforated plate and thereby in the rotating movement of the knives shear or cut those particles of material that are being forced through the perforations 16 by the action of the feed-screw 14.

To provide for the thorough cutting of the material at a point near the shaft, where the knives have the least movement and where it is not practicable to form the perforations in the plate 13, I construct the knives 19 in the forms shown in Figs. 6 and 7, wherein the rear part of the knife is cut away, as shown in Fig. 6, thereby forming the projecting point 22, which is turned ninety degrees inward, Fig. 7, toward the knife-holder and forming a cutting-edge at this point the entire width of the space between the perforated plate and the knife-holder, the knives being placed on the respective arms 18, as shown in Fig. 3, the curved point 22 of each knife being placed between the shaft 11 and the rear edge of the preceding knife.

By constructing the knives in the form just described it will be seen that the curved cutting-edges 22 thereof will cut a continuous path around the shaft at this point, the length of which extends the entire width of the space between the knife-holder and the perforated plate, thereby preventing the material from becoming packed and clogged at this point, which would materially interfere with the rotating movement of the shaft, the particular manner in which the knives are relatively placed upon the different arms 18 (shown in Fig. 3) permitting the curved cutting-edge 22 to be brought near the shaft and at the same time form ample space between the knives, whereby the manipulated material may escape therefrom.

Having described my invention and the manner of operating it, what I claim, and desire to secure by United States Letters Patent, is—

1. In a meat-cutting machine, the combination of a perforated plate, mechanism by which the material to be cut will be forced through the perforations in said perforated plate, a rotating shaft, a knife-holder fixed to said shaft, and one or more knives 19, each of which is provided with a straight cutting-edge 21, one end thereof terminating in the curved cutting-edge 22, the said knives being attached to the knife-holder in such manner that in their rotating movement the straight cutting-edge 21 thereof will be in contact with the surface of the said perforated plate, and the curved cutting-edge 22 will traverse a path near the said shaft, for the purpose set forth.

2. In a meat-cutting machine, the combination of a perforated plate, mechanism by which the material to be cut will be forced through the perforations of said perforated plate, a rotating shaft, a knife-holder fixed to said shaft and provided with beveled seats, and the knives 19, secured in the said beveled seats of the knife-holder, each of the said knives being cut away so that the projecting point 22 will be formed thereon, the said projecting point being curved, whereby the straight cutting-edge 21 of the knife will terminate in the curved cutting-edge 22, the said knives being attached to the knife-holder in such manner that in their rotating movement the straight cutting-edge 21 thereof will be in contact with the surface of the said perforated plate, and the curved cutting-edge 22 thereof will traverse a path near the said shaft, for the purpose set forth.

In testimony whereof I affix my signature in presence of two witnesses.

CHARLES ZIES.

Witnesses:
WM. L. BAILIE,
JNO. T. MADDOX.